United States Patent [19]

Raaber et al.

[11] Patent Number: 5,363,996
[45] Date of Patent: Nov. 15, 1994

[54] BICYCLE CARRIER ADAPTED TO BE MOUNTED ON THE BACK OF A VEHICLE

[75] Inventors: Raymond R. Raaber, Woodbury; Thomas A. Chimenti, New Canaan, both of Conn.

[73] Assignee: Industri AB Thule, Hillerstorp, Sweden

[21] Appl. No.: 114,172

[22] Filed: Sep. 1, 1993

[51] Int. Cl.⁵ .............................................. B60R 9/10
[52] U.S. Cl. ........................... 224/314; 224/42.03 B; 224/321; 224/329
[58] Field of Search ............... 224/314, 329, 324, 309, 224/321, 42.03 B, 42.03 R

[56] References Cited

U.S. PATENT DOCUMENTS

| | | | |
|---|---|---|---|
| 3,710,999 | 1/1973 | Allen | 224/42.03 B |
| 3,927,811 | 12/1975 | Nussbaum | 224/42.03 B |
| 4,332,337 | 6/1982 | Kosecoff | 224/42.03 B |
| 4,428,516 | 1/1984 | Allen | 224/314 |
| 4,513,897 | 4/1985 | Graber | 224/314 |
| 4,830,250 | 5/1989 | Newbold et al. | 224/314 |
| 5,135,145 | 8/1992 | Hannes et al. | 224/314 |
| 5,195,670 | 3/1993 | Piretti et al. | 224/314 |
| 5,211,323 | 5/1993 | Chimenti et al. | 224/314 |

*Primary Examiner*—Linda J. Sholl
*Attorney, Agent, or Firm*—Burns, Doane, Swecker & Mathis

[57] ABSTRACT

A bicycle carrier includes first and second mounting members and a pair of bicycle support arms, all interconnected by a pair of housings. The first mounting member is rotatable to a selected position of adjustment and is locked in that position by means of a locking engagement with the bicycle support arms. The bicycle support arms can be rotated to unlocking positions to enable the first mounting member to be adjusted to a different position.

23 Claims, 3 Drawing Sheets

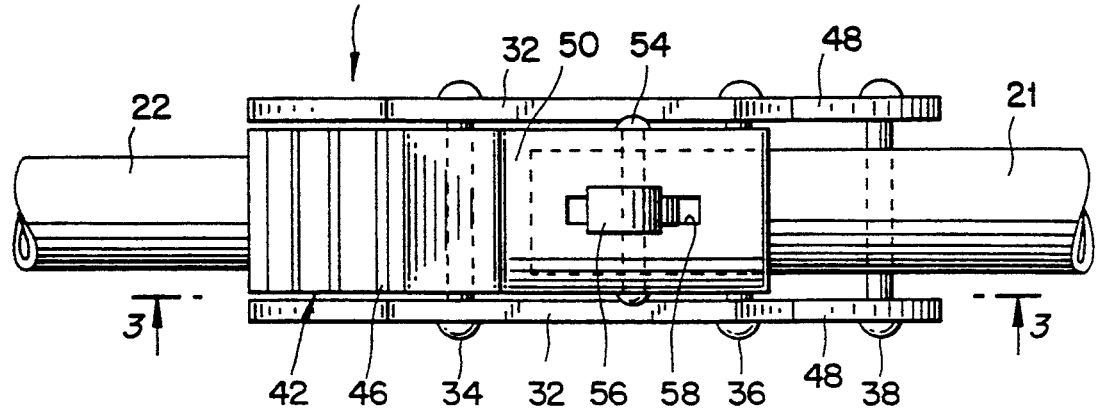
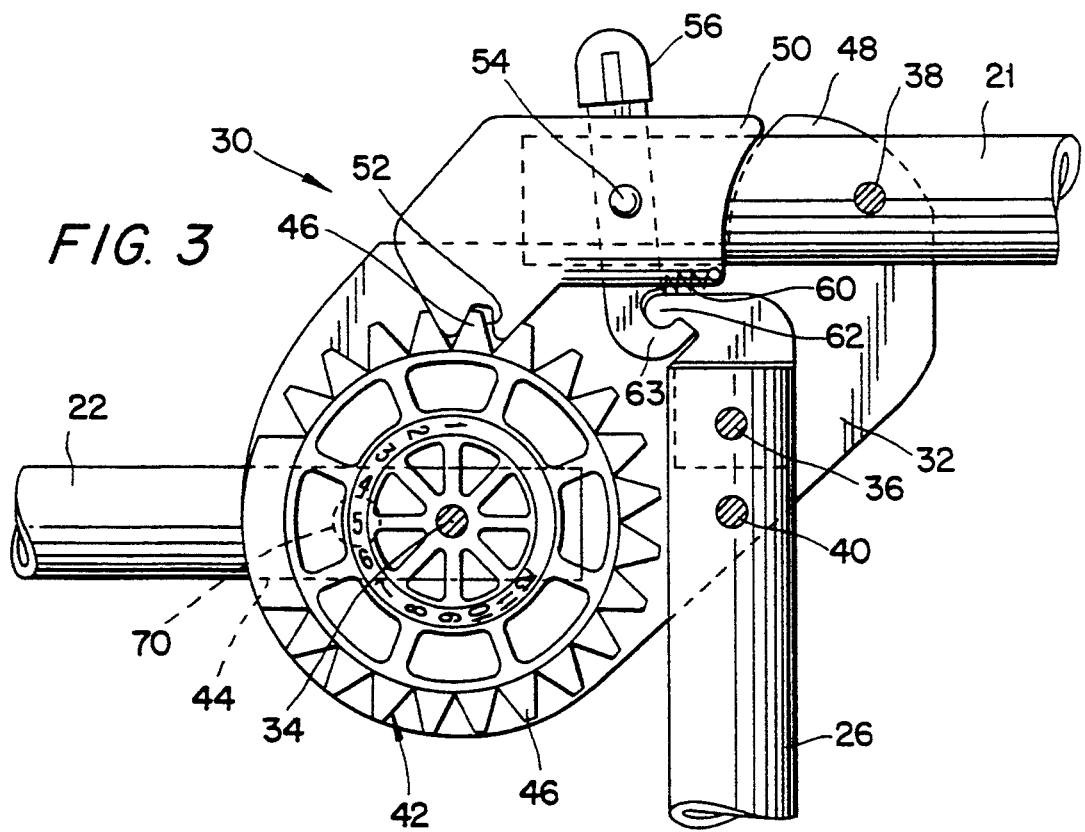

BICYCLE CARRIER ADAPTED TO BE MOUNTED ON THE BACK OF A VEHICLE

BACKGROUND OF THE INVENTION

The present invention relates to bicycle carriers adapted to be mounted on the backs of vehicles.

Bicycle carriers of that type are conventional, e.g., see U.S. Pat. Nos. 3,710,999; 3,927,811; 4,332,337; 4,428,516; 4,513,897; 4,830,250; and 5,211,323. It is common for a carrier to have first and second U-shaped mounting members which are seatable against upper and lower portions of the rear end of a vehicle, respectively. The carrier is attached to the vehicle by means of straps which are connected to the carrier and which carry hooks adapted to grasp portions of the vehicle. The mounting members are pivotable relative to one another, so that the angle formed between the mounting members can be adjusted to enable the carrier to fit different vehicle configurations. A pair of supporting arms project rearwardly for receiving a bicycle. The supporting arms include bent ends or adjustable brackets which form cradles on which a bar of the bicycle frame is laid.

It is necessary to be able to fasten the mounting members in place after the necessary adjustment has been made, and to release the mounting members to enable them to be pivoted to other operating positions and possibly to a folded storage position.

It would be desirable to provide such a fastening mechanism for a bicycle carrier which securely holds the mounting members in place but which can be quickly and easily released.

It would also be desirable to enable the bicycle carrier to be folded to a compact storage position.

SUMMARY OF THE INVENTION

The present invention relates to a bicycle carrier which is adapted to be mounted on the rear of a vehicle. The carrier comprises first and second mounting members, each of which includes a pair of end portions. A bicycle supporting structure is provided which includes a pair of support arms for supporting at least one bicycle. Each of the support arms includes an end portion. A pair of pivot-forming units is provided, each including a housing which is connected to: an end portion of the first mounting member, an end portion of the second mounting member, and an end portion of one of the support arms. The end portions of the first mounting member are rotatably mounted to respective ones of the housings for rotation relative thereto about an axis of rotation so that the first mounting member can be placed in selected rotational positions. The second mounting member or the bicycle supporting structure defines a locking device for the first mounting member. That locking device is movable relative to the housings such that the end portions thereof move into locking engagement with the end portions of the first mounting member in a direction extending transversely of the axis of rotation of the first mounting member, in order to lock the first mounting member in a selected rotational position.

Preferably, the locking structure is defined by the bicycle support arms.

Preferably, the support arms are rotatable about axes of rotation which are oriented parallel to the axes of rotation of the end portions of the first mounting member.

The end portions of the first mounting member are preferably oriented so as to be coplanar with respective end portions of the bicycle supporting structure.

A releasable securing member is preferably provided for securing the locking structure in locking engagement with the first mounting member. That securing member preferably comprises a pivotable latch mounted on the support arm and engageable with a fixed latch mounted on the second mounting member.

BRIEF DESCRIPTION OF THE DRAWINGS

The objects and advantages of the invention will become apparent from the following detailed description of a preferred embodiment thereof in connection with the accompanying drawings in which like numerals designate like elements and in which:

FIG. 2 is a top plan view of a portion of the bicycle carrier depicted in FIG. 1;

FIG. 3 is a sectional view taken along the line 3—3 in FIG. 2, depicting the carrier in a locked position.

DETAILED DESCRIPTION OF A PREFERRED EMBODIMENT OF THE INVENTION

Figure 1:
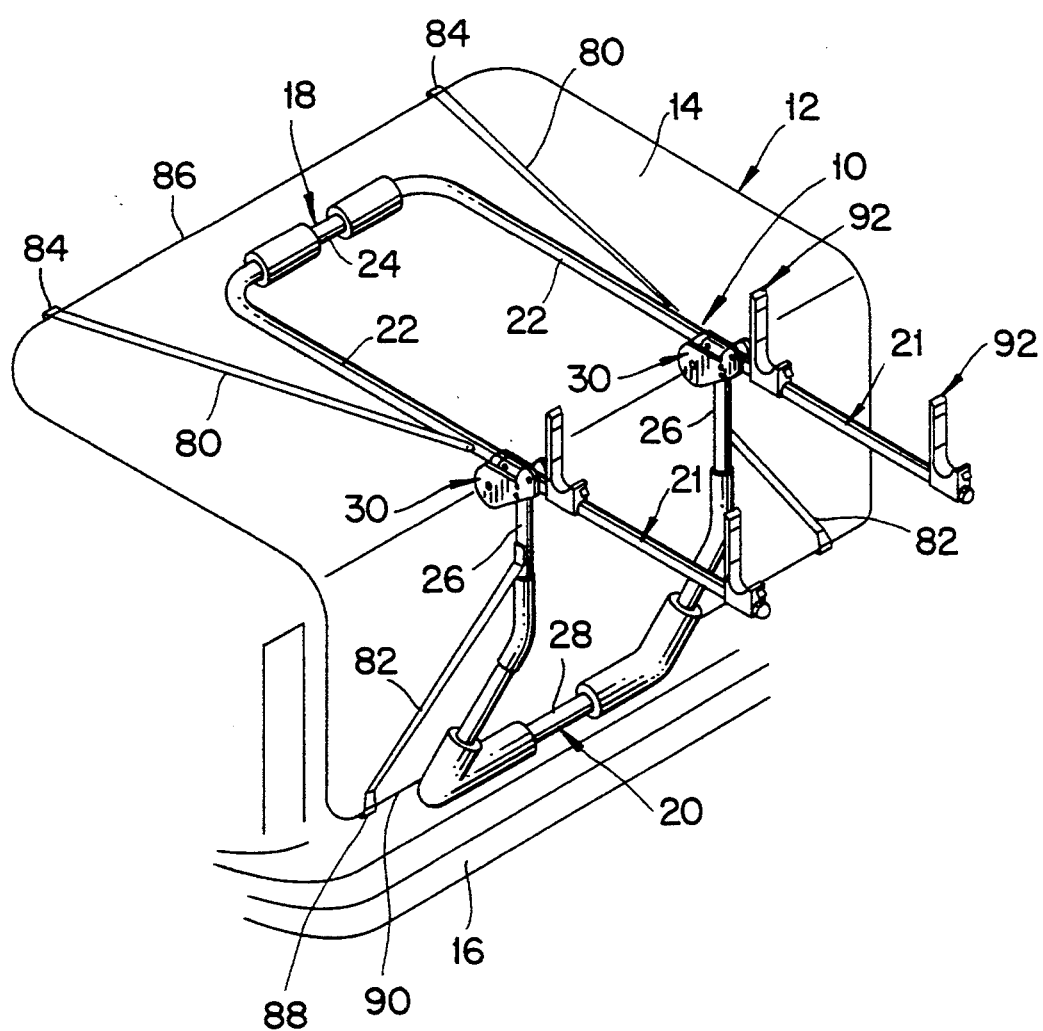
FIG. 1 is a top perspective view of the rear end of a vehicle to which has been mounted a bicycle carrier according to the present invention.

A bicycle carrier 10 according to the present invention is depicted in FIG. 1 as mounted on the rear of a vehicle 12. The vehicle 12 includes a trunk lid 14 and a bumper 16.

The carrier 10 comprises a frame formed by a pair of mounting members 18, 20, and a pair of bicycle supporting arms 21 which project rearwardly from the frame. An upper one of the mounting members 18 is U-shaped and comprises a pair of legs 22 interconnected by a bight portion 24. Likewise, a lower one of the mounting members 20 is U-shaped and includes a pair of legs 26 interconnected by a bight portion 28.

The mounting members are interconnected by two pivot-forming structures 30. Those structures 30 are of similar construction and one of the structures 30 is shown in detail in FIGS. 2-5. It will be understood that the following description of a structure 30 applies to both of the structures 30. The structure 30 comprises a housing formed by a pair of parallel side plates 32 which are spaced apart and interconnected by parallel rivets 34, 36, 38, 40. Alternatively, screws or other suitable fasteners could be used.

An upper end portion of a leg 26 of the lower mounting member 20 extends into a space formed by the side plates 32. Two of the rivets 36, 40 project through the side plates and the leg 26, so that the lower mounting member 20 is immovably affixed to the two structures 30.

An end portion of a leg 22 of the upper mounting member 18 extends into the space formed between the side plates 32 and is fixed to a rotary disk 42. The rivet 34 passes through the side plates 32, the disk 42, and the end portion of the leg 22. The disk 42 is rotatable about an axis defined by the rivet 34. That axis constitutes a common axis of rotation for the disks 42 of both of the structures 30, i.e., the axis coincides with the rivets 34 of both of the structures 30. A hole 44 formed at a periphery of the disk receives the leg 22 so that when the leg 22 is disposed within the hole 44 and is secured by the rivet 34, the leg 22 is fixedly secured to the disk 42, i.e., the leg is immovable relative to the disk. The disk includes a plurality of circumferentially spaced, radially projecting locking teeth 46 on its outer periphery.

An end portion of one of the supporting arms 21 extends between a pair of ear portions 48 of the side plates 32. The rivet 38 extends through the side plates 32 and the supporting arm 21 and defines a rotary axis for that supporting arm 21.

The end portion of the supporting arm 21 includes an end cap 50 which carries a locking recess 52 formed in a bottom portion thereof so as to face the disk 42. That locking recess 52 is sized to receive a locking tooth 46 of the disk 42 when the supporting arm 21 is rotated to a locking position (i.e., rotated counterclockwise to a terminal position as viewed in FIG. 3). As the supporting arm 21 rotates, the locking recess 52 moves transversely relative to the axis defined by the rivet 34 to mate with, or become separated from, the tooth 46. The tooth 46 which is received in the recess 52 comprises an uppermost tooth, i.e., a tooth located in substantially the twelve o'clock position of the disk.

Projecting through the supporting arm 21 and the end cap 50 is a rivet 54 which defines a pivot axis for a securing element in the form of a latch element 56 which releasably secures the supporting arm 21 in its locking position. The latch element 56 extends through an elongated slot 58 formed in the supporting arm 21 which permits the latch element 56 to pivot about the axis defined by the rivet 54. A tension spring 60 connected between the end cap 50 and the latch element 56 biases a latching hook 63 of the latch element 56 toward a latching position in which it engages a fixed latching hook 62 mounted at the top of the leg 26 of the lower mounting member 20 as depicted in FIG. 3. When the latching element 56 is latched, rotation of the supporting arm 21 is prevented, and the locking recess 52 retains a locking tooth 46 of the disk 42 to prevent rotation of the upper mounting member 18.

When the bicycle supporting arm 21 is being swung toward its locking position, the underside of the movable latching hook 63 engages the top side of the fixed latching hook 62 and is cammed in a clockwise direction with reference to FIG. 3 against the bias of the spring 60. Then, the movable latch element 56 is pivoted counterclockwise by the spring to engage the fixed latching hook 62.

Figure 4:
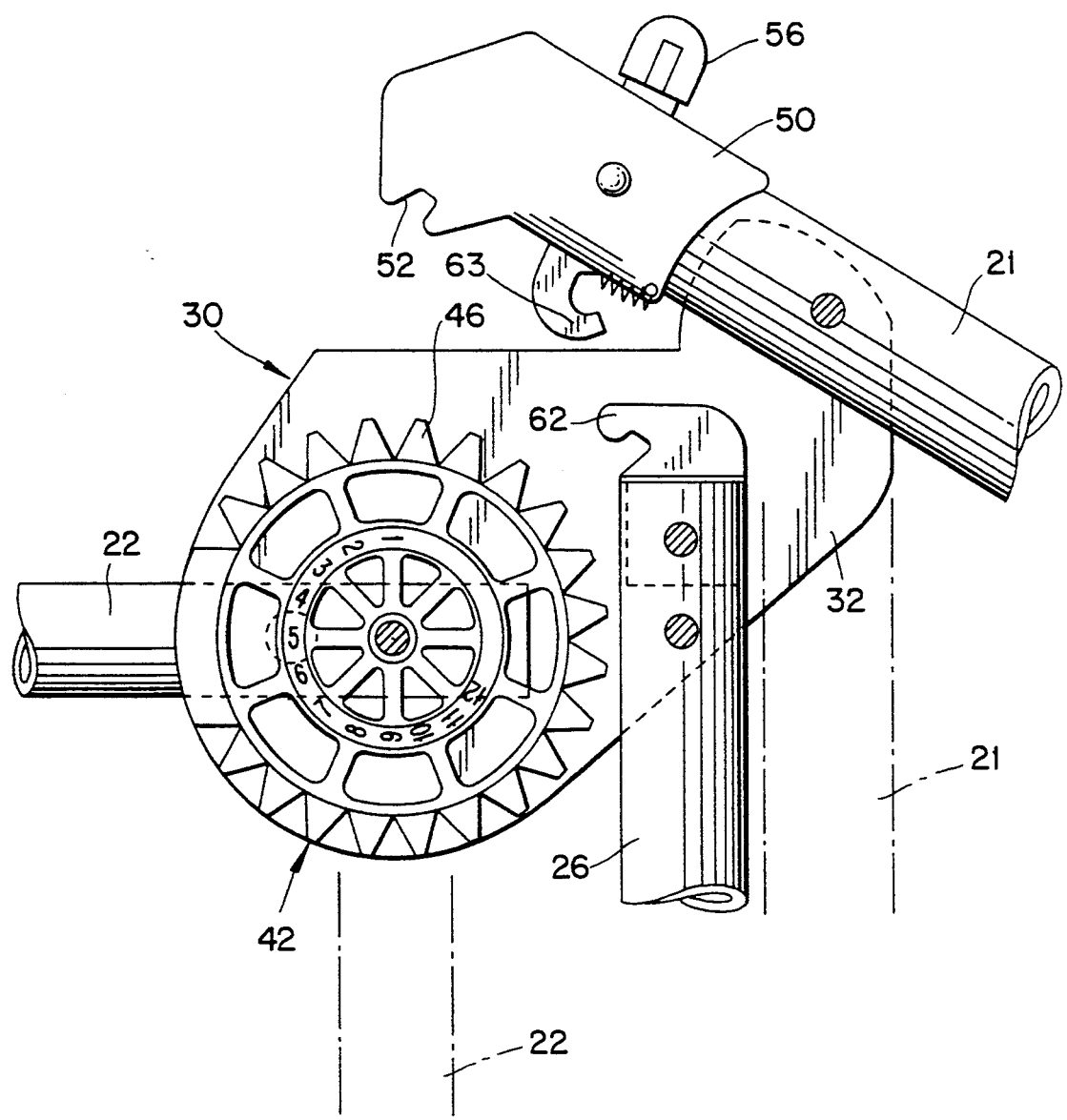
FIG. 4 is a view similar to FIG. 3 depicting the carrier in an unlocked position.

By pivoting the latch 56 to an unlatching position (i.e., pivoting the latch element 56 clockwise in FIG. 3), the latching hook 63 of the latch 56 is swung out of latching engagement with the hook 62, enabling the supporting arm 21 to be rotated about the axis of the rivet 38 (see FIG. 4). Consequently, the disk 42 is rotatable about the axis defined by the rivet 34 to re-locate the upper mounting member 18 in a new operating or use position or in a storage position in which the end portion of the leg 22 is oriented generally parallel to the end portion of the leg 26. The supporting arm 21 can also be swung to a storage position in which its upper portion is parallel to the end portion of the leg 26. This storage position of legs 21 and 22 is depicted in phantom lines in FIG. 4.

The disk 42 includes indicia in the form of indexing numbers which identify the various adjustment positions of the upper supporting member 18 as shown in FIG. 3, and as explained in detail in Chimenti et al U.S. Pat. No. 5,211,323. The indexing numbers are spaced apart in a circular path about the axis of the rivet 34. A window 70, represented by broken lines in FIG. 3, is formed in one of the side plates of at least one of the structures 30 to enable a user to view a particular one of the indexing numbers. The indexing numbers correspond to particular vehicle models to indicate which position of the mounting member 18 will best adapt the carrier to a particular vehicle model. A user is given a list of vehicles identifying the index number of the disk which matches particular vehicles.

IN OPERATION, a user refers to an instruction manual to identify which indicia number relates to the particular vehicle model to which the bicycle carrier 10 is to be mounted. The user then pivots the two latch elements 56 to release the bicycle supporting arms 21. Those arms 21 are then rotated to their unlocking positions (see FIG. 4), and the upper mounting member 18 is rotated until the proper indicia number becomes visible through the window 70. Then, the bicycle supporting arms 21 are rotated back to locking positions (see FIG. 3) so that the recess 52 of each arm 21 captures a locking tooth 46 of a respective disk 42 to lock the upper mounting member 18 in place. During this rotation of the arms 21 toward their locking positions, the pivotable latching elements 56 automatically mate with the fixed latching hooks 62 to re-secure the arms 21.

The carrier 10 is then placed upon the rear of the vehicle as shown in FIG. 1, and is secured in place by means of upper and lower straps 80, 82. The upper straps 80 are attached to the legs 22 of the upper mounting member 18, or the plates 32, and carry hooks 84 which engage an upper edge 86 of the trunk lid 12. The lower straps 82 are attached to the legs 26 of the lower mounting member 20, or to the plates 32, and carry hooks 88 which engage a lower edge 90 of the trunk lid 12. It will be appreciated, however, that the straps can be attached to any conveniently disposed parts of the vehicle.

The supporting arms 21 will be oriented substantially horizontally once the carrier has been properly installed. One or more bicycles are then mounted on the supporting arms 21 in any suitable manner, such as by means of cradles 92 as described in U.S. Pat. No. 5,211,323.

From the foregoing description, it will be realized that the present invention provides a bicycle carrier which can be easily and quickly adjusted to one of several well-secured use positions, as well as to a compact storage position.

The individual components of the carrier can be formed of any suitable materials. Preferably, however, the housing plates 32, the legs 21, 22, 26, the latch element 56, the hook 62, and all rivets are formed of metal, while the end cap 50 and the disk 42 (including the teeth 46) are formed of plastic.

Significantly, the disk 42 and end cap 50 can be formed of plastic, because no appreciable force will be applied at the tooth 46 captured within the locking recess 52. During use of the carrier, most of the weight of the bicycle will be borne by the lower mounting member 20. A moment or couple created by the weight of the bicycle and tending to rotate the arms 21 is resisted by the latch structure 56, 62. All of those forces are essentially isolated from disk tooth 46 captured in the recess 52 which only needs to resist a relatively weak torsion tending to rotate the disk 42. Thus, if desired, a relatively inexpensive plastic disk and end cap 52 can be used without jeopardizing the structural reliability of the carrier.

It will be appreciated that instead of having the supporting arms 21 define the locking means for the disks 42, this function could instead be performed by the legs 26 of the lower mounting member 20. In that event, the supporting arms 21 would be immovably affixed to the side plates 32, and each of the legs 26 would carry a locking recess 52 and would be latched in its locking position.

Any suitable securing means, in lieu of a latch, could be used. Moreover, if a pivoted latch element 56 is used, that element could be mounted to any suitable stationary part of the structure 30, such as the side plates 32 or the leg 26. This also applies to the fixed latching element 62, i.e., that element 62 could be attached directly to the side plates 32 or to the supporting arms 21.

A safety arrangement could be provided for preventing inadvertent swinging of the latch element to an unlatching position. For example, the upper, manually engageable end of the latch element could be spring-biased downwardly relative to the rest of the latch so that lateral portions of such upper end is normally biased downwardly into a recess formed in the end cap 50. By pulling up on the upper end of the element 56 so that it clears the recess, the element 56 would become swingable. Alternatively, a movable abutment could be mounted on the end cap which is movable into or out of the path of travel of the element 56 so as to selectively prevent or permit rotation of the element 56 to a latching position. Such an abutment could be pivotably or slidably mounted on the end cap, for example.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

We claim:

1. A bicycle carrier adapted to be mounted on the rear of a vehicle, comprising:
   first and second mounting members each including a pair of end portions;
   bicycle supporting means including a pair of support arms for supporting at least one bicycle, each of said support arms including an end portion;
   a pair of pivot forming means each including a housing connected to:
      an end portion of said first mounting member,
      an end portion of said second mounting member, and
      an end portion of one of said support arms, said end portions of said first mounting member being rotatably mounted to respective ones of said housings for rotation relative thereto about an axis of rotation to selected rotational positions;
   one of said second mounting member and said bicycle supporting means defining locking means for said first mounting member, said locking means being movable relative to said housings such that said end portions thereof move into locking engagement with said end portions of said first mounting member in a direction extending transversely of said axis of rotation for locking said first mounting member in a selected rotational position.

2. A bicycle carrier according to claim 1, wherein said bicycle supporting means defines said locking means.

3. A bicycle carrier according to claim 2, wherein said support arms are rotatable relative to said housings about respective axes of rotation oriented parallel to said axes of rotation of said end portions of said first mounting member.

4. A bicycle carrier according to claim 3, wherein each end portion of said first mounting member is coplanar with said end portion of a respective support arm.

5. A bicycle carrier according to claim 4, wherein said end portions of said first mounting member are defined by two fixedly interconnected legs, said end portions of said second mounting member being defined by two fixedly interconnected legs, said support arms being relatively movable.

6. A bicycle carrier according to claim 1, wherein said end portions of said locking means are rotatable relative to said housings about respective axes of rotation disposed parallel to said axes of rotation of said end portions of said first mounting member.

7. A bicycle carrier according to claim 1, wherein each end portion of said first mounting member is coplanar with said end portion of a respective support arm.

8. A bicycle carrier according to claim 1, wherein said first mounting member includes a pair of disks connected to respective said end portions of said first mounting member, each disk being connected to its respective housing for rotation about said axis of rotation, each said disk including a plurality of circumferentially spaced locking structures arranged for selective engagement by said locking means.

9. A bicycle carrier according to claim 7, wherein said locking structures of each disk comprise radially projecting teeth, said locking means including recesses for receiving said teeth.

10. A bicycle carrier according to claim 1, wherein at least one disk carries indicia corresponding to positions of adjustment of said first mounting member, and each housing includes a window through which one of said indicia is visible, said indicia corresponding to respective vehicle models so that each indicia indicates an adjustment position for a respective vehicle.

11. A bicycle carrier according to claim 1, wherein each of said pivot forming means includes releasable securing means for securing said locking means in locking engagement with said first mounting member.

12. A bicycle carrier according to claim 11, wherein said securing means comprises a manually displaceable latch mounted on said locking means and engageable with the other of said second mounting member and said bicycle supporting means.

13. A bicycle carrier according to claim 1, wherein said end portions of said first and second mounting members and said bicycle supporting means are positionable in substantially parallel relationship for storage.

14. A bicycle carrier adapted to be mounted on the rear of a vehicle, comprising:
   first and second mounting members each including fixedly interconnected legs, said legs of said first mounting member being fixedly attached to a disk having a plurality of first locking structures formed thereon;
   a pair of bicycle support arms for supporting at least one bicycle;
   a pair of pivot-forming means each connected to said first and second mounting members and to one of said support arms, each of said pivot-forming means comprising a housing forming a space, each disk being disposed in said space of a respective housing and mounted to said housing for rotation relative thereto about a first axis, each leg of said second mounting member extending into said space of a respective housing and being fixedly secured to said respective housing;

each of said support arms extending into said space of a respective housing and being mounted to said respective housing for rotation relative thereto about a second axis between locking and unlocking positions, each said support arm including a second locking structure arranged to be in locking engagement with one of said first locking structures when said bicycle support arms are in their locking positions to lock said disks against rotation, said disks being rotatable when said bicycle support arms are in their unlocking positions, each of said pivot-forming means including releasable securing means for securing a respective bicycle support arm in its locking position.

15. A bicycle carrier according to claim 14, wherein end portions of said legs of said first and second mounting members and end portions of said support arms are disposed in said space and are substantially coplanar.

16. A bicycle carrier according to claim 14, wherein said second locking structures are mounted on bottom portions of their respective support arms.

17. A bicycle carrier according to claim 14, wherein said releasable securing means includes a movable latching member mounted on each support arm for movement relative thereto between latching and unlatching positions.

18. A bicycle carrier according to claim 17 including a fixed latching element mounted to each leg of said second mounting member to be latchingly engaged by a respective movable latching member.

19. A bicycle carrier according to claim 18, wherein said fixed latching element and said movable latching member are formed of metal, and said disk is formed of plastic.

20. A bicycle carrier according to claim 14, wherein said first locking structures comprise radially projecting teeth, said second locking structures comprising means defining a recess for receiving one of said teeth disposed at an upper portion of said disk.

21. A bicycle carrier according to claim 14, wherein at least one of said disks carries indicia corresponding to positions of adjustment of said first mounting member, and said housing including a window through which one of said indicia is visible, said indicia corresponding to respective vehicle models so that each indicia indicates an adjustment position for a respective vehicle model.

22. A bicycle carrier according to claim 14, wherein said first and second mounting members, and said supporting arms are positionable in substantially parallel relationship for storage.

23. A bicycle carrier according to claim 14, wherein said securing means includes a movable latch element and safety means for preventing accidental movement of said latch element.

* * * * *